United States Patent [19]
Goudard et al.

[11] Patent Number: 5,489,095
[45] Date of Patent: Feb. 6, 1996

[54] DEVICE FOR PROTECTING THE VALIDITY OF TIME SENSITIVE INFORMATION

[75] Inventors: Jean-Louis Goudard, Guyancourt; Denis Pottier, L'Hay les Roses; Joseph Hoppe, Les Moliéres, all of France

[73] Assignee: U.S. Philips Corporation, New York, N.Y.

[21] Appl. No.: 82,074

[22] Filed: Jun. 23, 1993

[30]  Foreign Application Priority Data

Jul. 1, 1992 [FR] France ................................. 92 08099
Jul. 1, 1992 [FR] France ................................. 92 08100

[51] Int. Cl.$^6$ .............................. A63B 71/00; A63F 9/00
[52] U.S. Cl. .............................. 273/138 A; 380/3; 380/4; 380/25; 364/700
[58] Field of Search ................................. 364/408, 410; 380/25, 23, 4; 340/149 R; 358/349, 188; 235/380, 376, 492, 377; 273/138 A

[56] References Cited

U.S. PATENT DOCUMENTS

| | | | |
|---|---|---|---|
| 3,806,874 | 4/1974 | Ehrat | 340/149 R |
| 4,575,621 | 3/1986 | Dreifus | 235/380 |
| 5,073,931 | 12/1991 | Audebert et al. | 380/23 |
| 5,150,407 | 1/1992 | Chan | 380/4 |
| 5,168,372 | 12/1992 | Sweetser | 358/349 |
| 5,347,579 | 9/1994 | Blandford | 380/25 |

FOREIGN PATENT DOCUMENTS 2148135  9/1984  United Kingdom .

OTHER PUBLICATIONS

Data Sheet PCF8583–Philips Electronics N.V. (unknown date).
Data Sheet MC68HC05SC24–Motorola (unknown date).
FIBS PUB 46 of Jan. 15, 1977 from U.S. Dept. of Commerce/National Bureau of Standards.

Primary Examiner—Gail O. Hayes
Assistant Examiner—Hayward A. Verdon
Attorney, Agent, or Firm—Michael J. Balconi-Lamica

[57] ABSTRACT

The clock circuit is formed by an oscillator (10–12) which is coupled to a counter/divider circuit (15) provided with read accesses (30). In order to prevent falsification of its data, the circuit is formed as a protected casing and includes a protected access circuit (50) which is connected between said accesses and the counter/divider circuit. Furthermore, a circuit for monitoring the frequency of the oscillator may be provided (100–50).

6 Claims, 1 Drawing Sheet

DEVICE FOR PROTECTING THE VALIDITY OF TIME SENSITIVE INFORMATION

BACKGROUND TO THE INVENTION

The invention relates to a gaming device comprising:
data processing means including storage means;
data entry means for entering gaming data into said storage means,
free-running clock means having clock state accumulation means communicating with said data entry means for entering an instantaneous clock state associated with said gaming data into said storage means;
and readout means for at a later instant reading out said gaming data and associated clock state as a game entry.
Free-running clocks are well-known. Certain novel applications of such clocks impose new requirements, such as in the field of games. The device described in U.S. Pat. No. 5,073,931 enables the recordings of wagers by subjects with respect to sporting and other events that take place in front of their eyes. Now, in view of financial and other consequences, the instant of wagering, that often must take place before a particular time limit, may not be falsified. In particular a fraudulent player could attach an earlier instant to his wager, thereby effectively allowing him to make the wager or bet while already knowing the outcome.

SUMMARY TO THE INVENTION

Accordingly, amongst other things it is an object of the present invention to provide a gaming device of the kind described which puts countermeasures in force against this particular type of fraudulent behaviour. Now, according to one of its aspects, the invention is characterized by comprising protection means for physically blocking predetermined tampering actions with respect to said free-running clock means.

Various effective but inexpensive measures can be taken that yet would provide a high hurdle for such fraudulent person to be taken.

Advantageously, said protection means comprise monitoring means for real-time monitoring an actual clock frequency with respect to conforming to a prescribed clock frequency range, and invalidation means fed by said monitoring means for generating a persistent invalidation information within said gaming device upon detection of nonconformance, whereby external lowering or raising of said clock frequency invalidates said gaming device. Tampering with the clock could mean increasing as well as decreasing the clock frequency with respect to its nominal value. If the clock must have run a particular distance between wagering time and subsequent validation time, the fraudulent person tries to increase the clock frequency during that particular real time interval. If the clock may not have run longer than a particular real time interval between a validation start interval and wagering instant, the fraudulent person tries to decrease the clock frequency in the time between the start interval and the actual wagering instant.

By itself, GB-A-2,148,135, especially page 8, lines 43–53 describe the resetting of a time clock memory content upon detection of a tampering operation. This would mean that after such resetting the fraudulent person could undertake a more sophisticated attempt with the same hardware. According to the present invention, the actions themselves are blocked, whereas the reference only invalidates the results of the tampering.

Various advantageous aspects of the invention are recited in dependent Claims.

BRIEF DESCRIPTION OF THE DRAWING

The following description, accompanied by the attached drawings, all given by way of a non-limitative example, will offer a better understanding as to how the invention can be carried out.

DETAILED DESCRIPTION OF PREFERRED EMBODIMENTS

Figure 1:
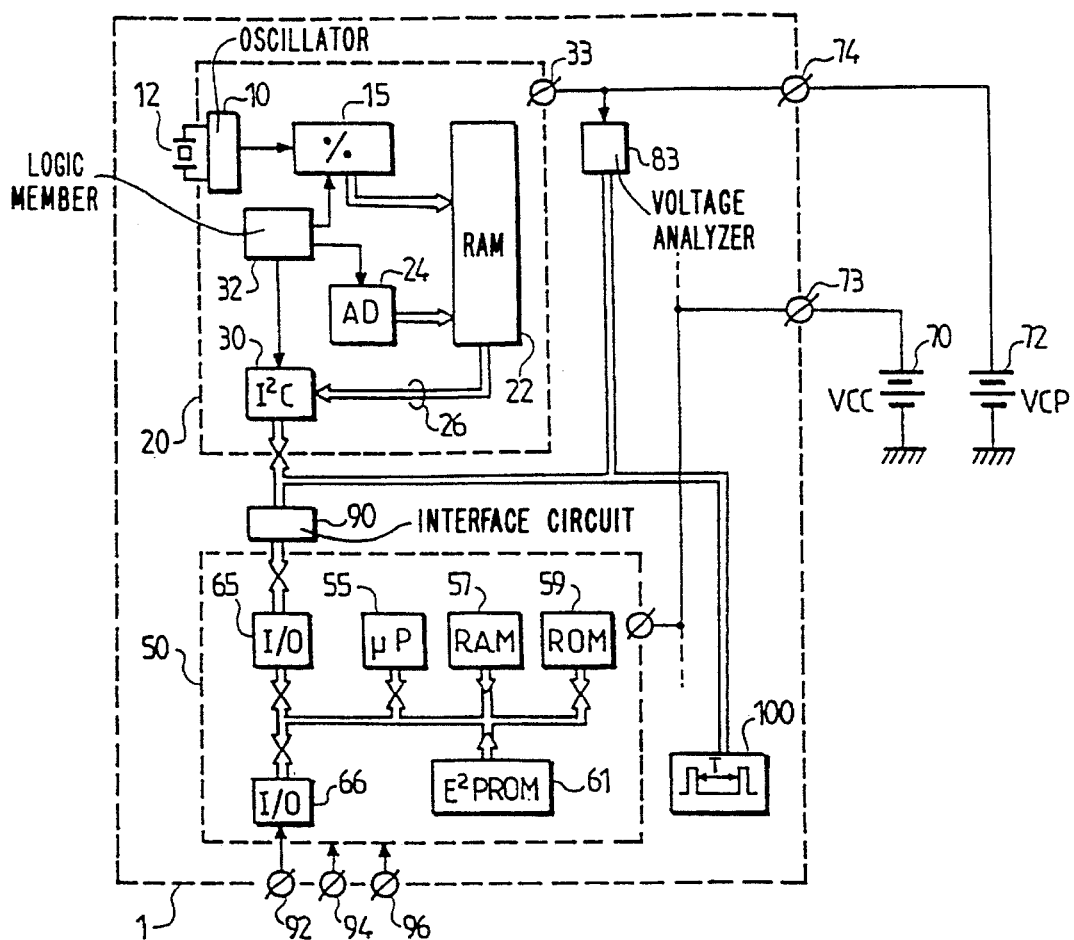
FIG. 1 shows the diagram of the circuit in accordance with the invention.

FIG. 1 shows a diagram of a circuit in accordance with the invention. The overall circuit is labelled '1'. It comprises essentially an oscillator 10 which is controlled by a quartz crystal 12, and a counter/divider 15. These components may form part of an integrated circuit 20 of the kind commercially available under type number PCF8583 from Philips Electronics N.V., Eindhoven, the Netherlands. The contents of this counter/divider provides various date information for a RAM 22 which is addressed by an addressing member 24. This output information is: the year, the month, the day, the hour, the minutes, the seconds, etc. Other information can also be stored in said memory: alarm information, rules information, etc. The information stored in this memory can be read via a line 26 connected to its output. An interface 30 enables communication of the $I^2C$ type with the environment of the circuit 20. A logic member 32 enables control of the entire operation of this circuit 20. The circuit 20 is powered by a voltage applied to a terminal 33.

In order to prevent falsification of the information produced by the circuit 20, in accordance with the invention a protection circuit 50, in hybrid form or of not, is integrated on the same substrate as the circuit 20.

Due to the integration, no intervention whatsoever can take place in the circuit 1. Integration may be accompanied by encapsulation of the entire circuit 1, making intrusions even more unlikely.

The protection circuit is 50, for example a circuit of the kind commercially available under type number MC6805SC24 from Motorola. This circuit is formed by a microprocessor 55 whereto there are connected a RAM 57, a ROM 59 which contains the instructions for the operation of the microprocessor 55, and also an EEPROM 61 which can store various data which cannot be erased by interruption of the power supply.

This circuit 50 has been in extensive commercial use in the chip card or smart card market, the latter now having attained common general knowledge.

For communication, this circuit comprises an access assembly 65, 66, a part 65 of which is dedicated to communication within the circuit 1 whereas the other part 66 is dedicated to communication with the environment.

In a first embodiment, the circuit 1 is powered by two voltage sources 70 and 72 via two power supply terminals 73 and 74. The source 72 is provided for powering exclusively the circuit 20.

Figure 2:
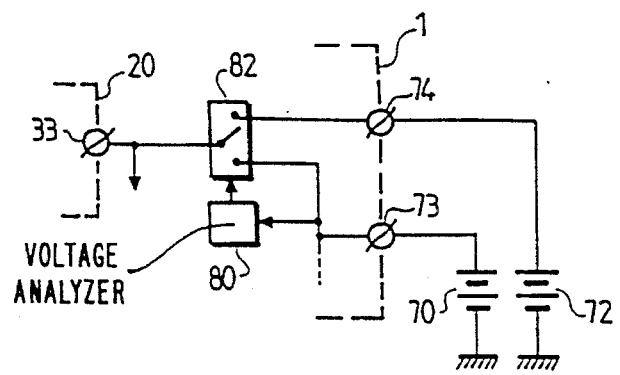
FIG. 2 shows a further version of the circuit in accordance with the invention.

In a second embodiment as shown in FIG. 2, the circuit 1 is powered by the same two voltage sources 70 and 72. However, the source 70 preferably powers the circuits, even the circuit 20. Should this source break down, such a failure is detected by a supply voltage analyzer 80 (FIG. 2) which in that case connects a voltage switch 82 so that the circuit 20 is powered by the voltage source 72.

The importance of these steps resides in the fact that a given autonomy of this clock circuit 20 can be ensured (for a few years, taking into account its low power consumption) whereas the powering of the environment for which it operates may necessitate several changes of batteries (source 70).

However, interruption of the supply voltage for the circuit 20 is detected by another voltage analyzer 83 which is connected to the supply terminal 33. The voltage interruption information can be reflected by the state of the data stored in the memory 22. The state of this supply voltage can also be analyzed by the circuit 50 by applying thereto the detection made by the analyzer 83 during its I²C access to the circuit 20.

In order to enable communication between this bus and the protection circuit 50 there is provided an interface circuit 90. The program provides the communication on this bus while respecting the protocol defined by the measures taken in respect of the I²C bus.

The information concerning the clock is made accessible, via the circuit 50, on an access 92. The circuit 1 comprises, in addition to the supply terminals 73 and 74, two other ports 94 and 96 for the re-initialization of the circuit and the application of clock signals, respectively, required by the processor 55.

The device according to the present invention thus comprises a data processing means including a storage means. A data entry means is provided for entering gaming data into the storage means. A free-running clock means having a clock state accumulation means is provided for communicating with the data entry means, and further for entering an instantaneous clock state associated with the gaming data into the storage means. A readout means is provided for reading out, at a later instance, the gaming data and the associated clock state as a game entry (i.e., time sensitive information). Lastly, a protection means is provided for blocking predetermined tampering actions with respect to the free-running clock means.

In a preferred mode of operation, the circuit 50 operates in conformity with the DES encryption/decryption algorithm as defined, for example in the publication:

Federal Information Processing Standards Publication (FIPS PUB46) of Jan. 15, 1977, National Bureau of Standards of the Department of Commerce of the United States of America.

An encryption key C is stored in the EEPROM 61.

Thus, on the access 92 the date DAT may be visible, but it is accompanied by a DES code (C, DAT). The integrity of this date DAT can thus be verified, provided that C is known, all precautions being taken that this key C remains unknown to a potential fraud.

The process can be complicated by applying a hazard "a" to the clock circuit 1 so that the date is accompanied by a DES code (C, a, DAT).

However, the above provisions are not always sufficient to prevent fraud. Therefore, attempts can be made to counteract tentative fraud by variation of the frequency of the oscillator in favour of the fraud via unforeseen influencing of given parameters (for example, the temperature).

In order to avoid this, in accordance with the invention there is provided a circuit 100 for monitoring the frequency of said oscillator.

This circuit is formed on the basis of a monostable circuit 100. During the switching period T of this circuit, the number of pulses of the oscillator 10 are counted. If the count is not appropriate, invalidation information can be produced. Two pulses are derived from this circuit: one pulse for signalling the start of the period T, and the next pulse for signalling the end.

Monitoring can be controlled by the microprocessor 55 on the basis of a program stored in the ROM 59.

Thus, at a given instant a signal traversing the interface 90 and transported by the I²C line triggers the monostable circuit 100 which supplies a pulse in the direction of the clock circuit 20. This pulse is accompanied by a command for storing the time defined by the counter/divider 15 in the memory 22. After a period of time T, the second pulse appears, which pulse causes the storage of a second content in the memory 22. Subsequently, the two contents are subtracted from one another and the subtraction result is compared with a standard value stored in the EEPROM 61. If the result of the subtraction is comparable, taking into account an acceptable precision, the clock circuit is considered to be in order; if it is not, invalidation information is stored in the EEPROM 61. The circuit governing the use of the clock circuit will have to verify the presence or absence of this invalidation information in order to ascertain the reliability of the values supplied by this circuit.

The standard value stored in the memory 61 is also obtained by standardization. This standardization is necessary because the period T may vary from one monostable circuit to another, but its precision is the same from one circuit to another.

We claim:

1. A device for protecting the validity of time sensitive information, said device comprising:

data processing means including storage means;

data entry means for entering time sensitive data into the storage means of said data processing means;

free-running clock means having clock state accumulation means communicating with said data entry means for entering an instantaneous clock state associated with entering of the time sensitive data into the storage means, wherein the time sensitive data and instantaneous clock state comprise the time sensitive information; and protection means for physically blocking predetermined tampering actions with respect to said free-running clock means, wherein physically blocking predetermined tampering actions corresponds to preventing a falsification of the time sensitive information, the falsification of time sensitive information characterized as that being attempted by the predetermined tampering actions with respect to said free-running clock means, wherein said protection means comprises monitoring means for real-time monitoring an actual clock frequency with respect to conforming to a prescribed clock frequency range, and invalidation means fed by said monitoring means for generating a persistent invalidation information upon a detection of a non-conformance.

2. The device for protecting the validity of time sensitive information as claimed in claim 1, wherein said protection means further comprises means for blocking an access from said data entry means to said clock state accumulation means.

3. The device for protecting the validity of time sensitive information as claimed in claim 1, wherein said protection means further comprises a second monitoring means for monitoring one of a voltage and a current for powering said device and wherein said protection means further comprises invalidation means for providing invalidation information when one of the voltage and the current is not included in a predetermined range.

4. The device for protecting the validity of time sensitive information as claimed in claim 3, further comprising a first power source for powering said free-running clock means and a second power source for powering said protection means.

5. The device for protecting the validity of time sensitive information as claimed in claim 3, further comprising a first power source for powering said free-running clock means and said protection means, and still further comprising an emergency power source for said free-running clock means, wherein said emergency power source is selectively activatable by said second monitoring means.

6. A chip card for interfacing to a terminal device, said card including a device for protecting the validity of time sensitive information, said device comprising:

data processing means including storage means;

data entry means for entering time sensitive data into the storage means of said data processing means;

free-running clock means having clock state accumulation means communicating with said data entry means for entering an instantaneous clock state associated with entering of the time sensitive data into the storage means, wherein the time sensitive data and instantaneous clock state comprise the time sensitive information; and protection means for physically blocking predetermined tampering actions with respect to said free-running clock means, wherein physically blocking predetermined tampering actions corresponds to preventing a falsification of the time sensitive information, the falsification of time sensitive information characterized as that being attempted by the predetermined tampering actions with respect to said free-running clock means, wherein said protection means comprises monitoring means for real-time monitoring an actual clock frequency with respect to conforming to a prescribed clock frequency range, and invalidation means fed by said monitoring means for generating a persistent invalidation information upon a detection of a non-conformance.

* * * * *